2 Sheets—Sheet 1.

A. S. DINSMORE.
Sewing-Machine.

No. 8,575. Reissued Feb. 11, 1879.

Witnesses
L. F. Crosby
A. C. Whiting

Inventor.
Alfred S. Dinsmore
by Crosby & Gregory Atty.

2 Sheets--Sheet 2.

A. S. DINSMORE.
Sewing-Machine.

No. 8575

Reissued Feb. 11, 1879

Witnesses.
C. H. Latimer.
Wm Pratt.

Inventor.
Alfred S. Dinsmore
PER Crosby & Gregory
ATTY'S.

THE GRAPHIC CO. PHOTO.-LITH. 39 & 41 PARK PLACE, N.Y.

UNITED STATES PATENT OFFICE.

ALFRED S. DINSMORE, OF BOSTON, MASSACHUSETTS.

IMPROVEMENT IN SEWING-MACHINES.

Specification forming part of Letters Patent No. 160,512, dated March 9, 1875; Reissue No. 8,575, dated February 11, 1879; application filed December 2, 1878.

*To all whom it may concern:*

Be it known that I, ALFRED S. DINSMORE, of Boston, in the county of Suffolk and State of Massachusetts, have invented an Improved Sewing-Machine, of which the following is a specification:

My invention relates to improvements in sewing-machines for use in factories or other places where it is desired to unite piece-goods in order to form long continuous pieces.

In my machine the fabrics to be united are impaled on pins projecting from a horizontally-moving circular baster plate or ring, (shown as toothed at top,) to be engaged and moved by a toothed wheel actuated directly from a worm on the rotating hook-shaft of the sewing-machine proper, which is shown placed in a vertical position, or so that the needle reciprocates in substantially a horizontal plane.

My invention consists in the combination, with sewing mechanism and an annular baster-plate, of mechanism, substantially as hereinafter described, for moving the baster-plate and fabric from a worm on the rotating hook-shaft of the machine; and, also, in the combination, with the gear for moving the baster-plate, of a pawl and ratchet, whereby the toothed wheel that engages the teeth of the baster-plate may be disengaged from its operating-shaft, so that the baster-plate and fabric may be turned freely in either direction to bring the fabric in position quickly to receive the needle.

Figure 1:
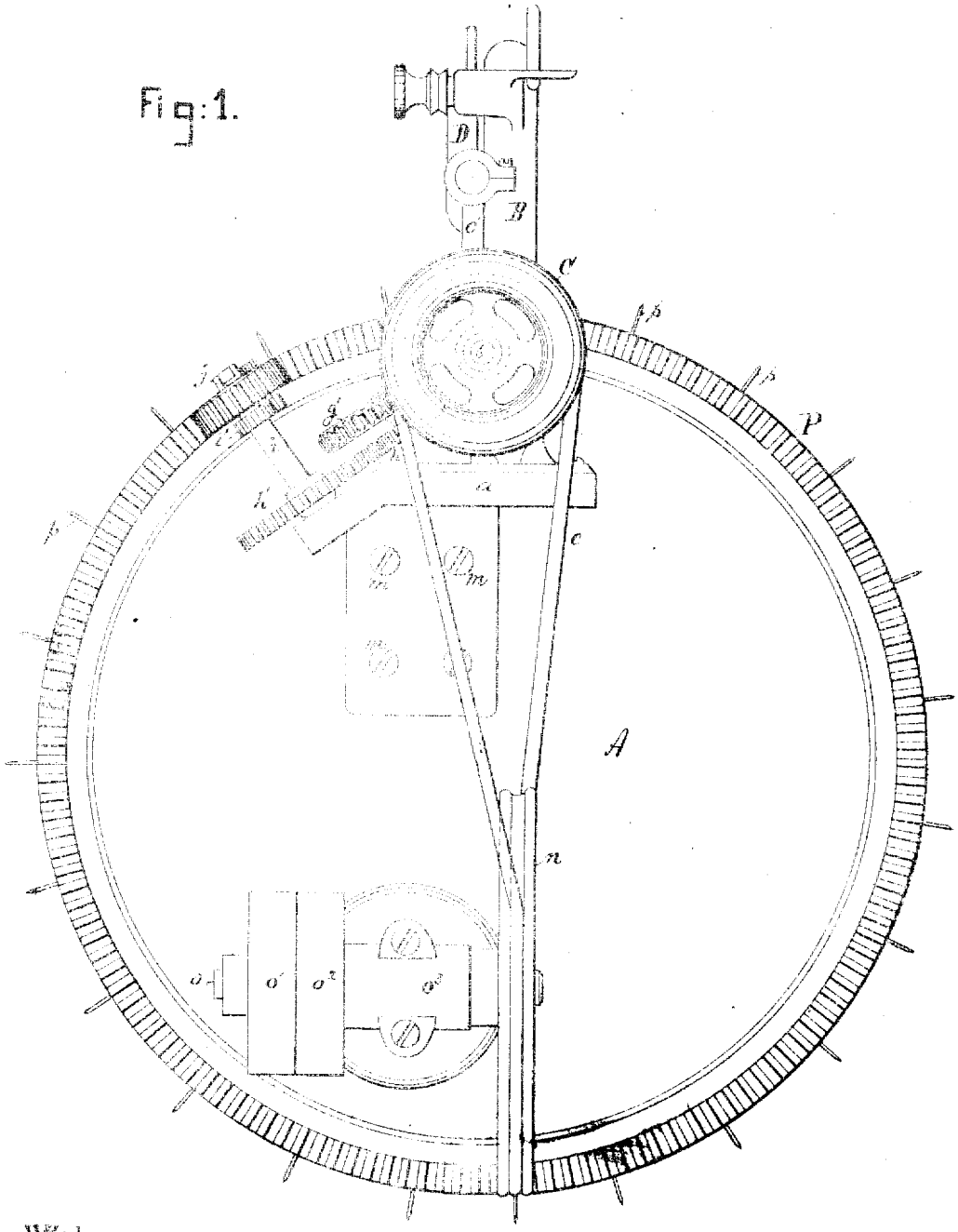
Figure 2:
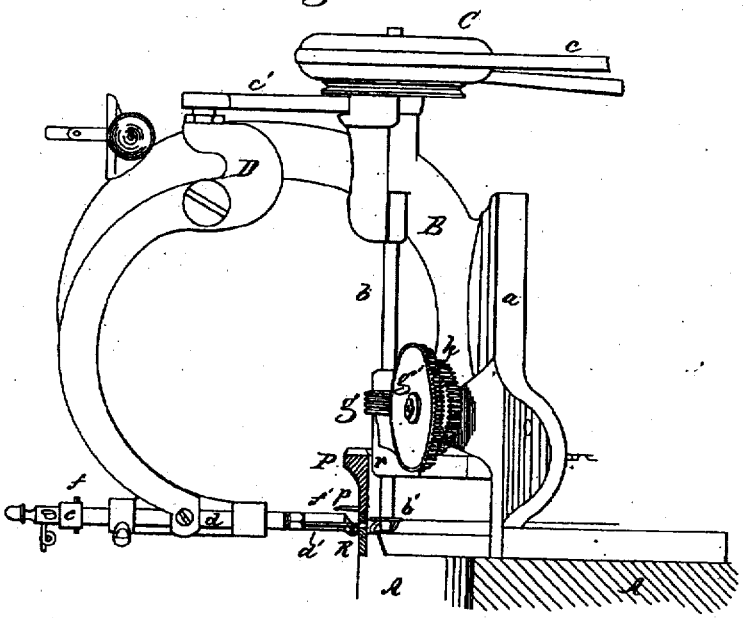
Figure 3:
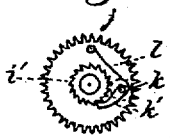

Figure 1 is a top view of my invention. Fig. 2 is a side view of the baster-plate with a part of its driving mechanism broken away; and Fig. 3 is a view of the pawl and ratchet and toothed wheel for driving the baster-plate.

In the drawings, A is the frame of the machine, circular in form, to receive the flanged supporting-ring R, on which rests and is moved the baster-plate P, provided at top with teeth, and having projecting from it fabric-holding pins *p*, on which the fabric is impaled, and by which the fabric is suspended.

A stitch-forming mechanism, preferably of the Willcox & Gibbs class, is supported on a standard, *a*, rising from the frame A, and is mounted with relation to the rotating annular baster-plate, so that the baster-plate moves between the hook-shaft and presser-foot, and the needle works through a needle-hole made in the ring R.

The G-shaped arm B of the sewing-machine has its base attached to a vertical standard, *a*, secured to frame A by screws *m*, or otherwise, and the hook-shaft *b*, provided with hook *b'*, for forming, in connection with an eye-pointed needle, the usual chain-stitch, is driven by a belt, *c*, over its fly-wheel C, the belt extending from such fly-wheel to a fly-wheel, *n*, on a shaft, *o*, provided with fast and loose pulleys $o^1$ $o^2$, operated by power. The shaft *o* is supported in a bearing, $o^3$, at the top of a standard rising from frame A. I do not, however, limit myself to these devices for rotating the shaft *b*, as other suitable or well-known devices may be employed instead.

The vibrating arm D, supported on arm B, is connected with the needle-carrying bar *d*, and the arm is vibrated through the link *c'*, connected with it and with an eccentric on the hook-shaft *b*. On the needle-bar is a collar, *e*, having a finger projecting from it toward the stock of the presser-foot *f'*, and under a second flanged collar, *f*, on such presser-foot stock. This finger, as the needle-bar rises, acts against the collar *f*, and lifts the presser-foot *f'* from the fabric just as the point of the needle is withdrawn therefrom, in order to leave the fabric entirely free to be moved by the baster-plate, and the said presser-foot again strikes the fabric just as the needle is to penetrate the fabric. On the rotating hook-shaft *b* is a worm, *g*, that engages a toothed wheel, *g'*, mounted on a stud projecting from the standard *a* or other suitable support. On the collar of this wheel *g'* is a toothed wheel, *h*, that engages a larger toothed wheel, *h'*, on a shaft, *i*, having an attached ratchet-wheel, *i'*. This shaft also carries a toothed wheel, *j*, mounted loosely thereon, but held so as to move with the shaft by means of a pawl, *k'*, on the end of pin *k*, having a milled nut, so that the operator of the machine may turn the pawl by hand.

When the pawl *k'* is in the position shown in Fig. 3, the rotation of the shaft *i* will move the toothed wheel, and consequently the baster-plate, so as to carry the fabric along under the needle and perform sewing, the spring *l* then holding the pawl in engagement; but the pawl may be disengaged, when it is desired to move the baster-plate, without moving the sewing mechanism, as is often the case, to place the fabric on the pins *p*, and to move it quickly in place under the needle, or to reverse or turn back the baster-plate in case of imperfection in the sewing or seam. When the pawl is turned away from the position shown in Fig. 3, the spring *l* bears on the back side of the pawl and holds it from the ratchet-wheel *i'*.

The needle is supplied with thread, in the usual way, from a spool.

In operation, two pieces of fabric to be joined or sewed together are impaled on the pins *p*, the pawl *k'* being disengaged from the ratchet, and when the fabric is properly secured on the pins the baster-plate is moved so as to bring the edge of the fabric under the needle, which works through a throat in the ring R; then the pawl *k'* is turned to engage the ratchet *i'*, and the machine is started, after which the worm-gear *g* and gears *g' h h' j* move the baster-plate along the distance of a stitch at each revolution of the shaft *b*. The forward bearing, *r*, of the hook-shaft *b* is curved, to adapt it to the curved baster-plate. The fabric is entirely relieved from friction of the presser when the baster-plate is moving, and the presser-foot acts as a holder to prevent any movement of the fabric while the needle is in the cloth.

I am aware that an annular baster-plate has been driven by gearing set in motion by a shaft having a worm upon it; but in the machine containing said devices so far referred to the shaft having the worm upon it was rotated by means of a band extended about a pulley on the said shaft and a pulley on the rotating hook-shaft of the machine.

The aim of my invention is to insure that the annular wheel which moves the fabric be actuated positively by and in unison with the rotating hook which forms the needle-thread into a loop for each stitch. I accomplish this object by applying directly upon the rotating hook-shaft the worm which sets in motion the toothed gearing which actuates the baster-plate. Slippage of a band connecting the hook-shaft with a shaft for moving a baster-plate would throw the stitch-making and cloth-moving parts out of time, break the thread, and produce imperfect work.

I claim—

1. In a sewing-machine, the rotating hook and hook-shaft, and worm fixed upon it, combined with an annular baster-plate or cloth-feeding device, and toothed gearing intermediate between the worm and the baster-plate, to operate the latter positively from the worm upon and in unison with the rotating hook of the rotating hook-shaft, substantially as described.

2. In combination, the rotating hook-shaft and its worm, the shaft *i*, operated by gearing actuated by the hook-shaft, the ratchet, the toothed wheel *j*, and pawl, and a baster-plate, substantially as and for the purpose set forth.

3. The horizontally-moving baster-plate, combined with the needle-bar, needle, presser-bar, presser, and finger, and collar *f*, the finger and collar holding the presser from the fabric while the feed takes place or the baster-plate is moving, substantially as and for the purpose set forth.

4. The combination of the frame A and its standard, for supporting a stitch-forming mechanism, with the circular and toothed baster-plate, the supporting-ring, and mechanism actuated by the hook-shaft to move the baster-plate, substantially as described.

ALFRED S. DINSMORE.

Witnesses:

G. W. GREGORY,

L. F. CONNOR.